US006549652B1

(12) United States Patent
Persiantsev et al.

(10) Patent No.: US 6,549,652 B1
(45) Date of Patent: Apr. 15, 2003

(54) METHOD AND APPARATUS FOR REDUCING NOISE DURING LOSSY TRANSFORMATION PROCESSES

(75) Inventors: Michael I. Persiantsev, Nevada City, CA (US); Rajugopal R. Gubbi, Fair Oaks, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/151,473

(22) Filed: Sep. 11, 1998

(51) Int. Cl.[7] .................................................. G06K 9/00
(52) U.S. Cl. ....................................... 382/162; 382/251
(58) Field of Search .................................. 382/162–167, 382/248–251; 345/132–138, 139–153; 348/428

(56) References Cited

U.S. PATENT DOCUMENTS

| | | | |
|---|---|---|---|
| 4,217,609 A | 8/1980 | Hatori et al. ................ 358/136 |
| 4,302,775 A | 11/1981 | Widergren et al. ......... 358/136 |
| 4,394,774 A | 7/1983 | Widergren et al. ........... 382/56 |
| 4,571,618 A | 2/1986 | Hatori et al. ................ 358/136 |
| 4,646,148 A | 2/1987 | Lienard et al. ............. 358/135 |
| 4,704,628 A | 11/1987 | Chen et al. .................. 358/136 |
| 4,827,339 A | 5/1989 | Wada et al. ................. 358/136 |
| 5,046,119 A | 9/1991 | Hoffert et al. ................ 382/56 |
| 5,086,480 A | 2/1992 | Sexton ......................... 382/18 |
| 5,091,782 A | 2/1992 | Krause et al. .............. 358/135 |
| 5,146,325 A | 9/1992 | Ng ............................... 358/135 |
| 5,177,796 A | 1/1993 | Feig et al. .................... 382/56 |
| 5,185,819 A | 2/1993 | Ng et al. ....................... 382/56 |
| 5,305,113 A | 4/1994 | Iwamura et al. ............ 358/312 |
| 5,327,173 A | 7/1994 | Nishizawa et al. ......... 348/412 |
| 5,347,308 A | 9/1994 | Wai ............................. 348/394 |
| 5,379,356 A | 1/1995 | Purcell et al. ................ 382/56 |
| 5,386,234 A | 1/1995 | Veltman et al. ............. 348/409 |
| 5,408,542 A | 4/1995 | Callahan ...................... 382/56 |
| 5,428,693 A | 6/1995 | Murakami et al. .......... 382/232 |
| 5,432,870 A | 7/1995 | Schwartz ..................... 382/232 |
| 5,467,134 A | 11/1995 | Laney et al. ................ 348/409 |
| 5,473,380 A | 12/1995 | Tahara ......................... 348/423 |
| 5,481,275 A * | 1/1996 | Mical et al. ................. 345/132 |
| 5,497,338 A | 3/1996 | Miyake et al. .............. 364/514 |
| 5,519,790 A | 5/1996 | Manning ..................... 382/236 |
| 5,539,667 A * | 7/1996 | Rode ........................... 345/428 |
| 5,544,266 A | 8/1996 | Koppelmans et al. ....... 382/238 |
| 5,553,160 A | 9/1996 | Dawson ....................... 382/166 |
| 5,570,133 A | 10/1996 | Yagasaki ..................... 348/416 |
| 5,574,504 A | 11/1996 | Yagasaki et al. ............ 348/415 |
| 5,592,229 A | 1/1997 | Sugiyama .................... 348/416 |
| 5,598,483 A | 1/1997 | Purcell et al. ............... 382/232 |
| 5,600,737 A | 2/1997 | Kurakami et al. ........... 382/232 |
| 5,602,594 A | 2/1997 | Cho et al. .................... 348/419 |
| 5,612,744 A | 3/1997 | Lee et al. .................... 348/416 |
| 5,671,022 A * | 9/1997 | Ishida .......................... 348/659 |
| 6,157,735 A * | 12/2000 | Holub ......................... 382/167 |
| 6,191,772 B1 * | 2/2001 | Mical et al. ................. 345/138 |

OTHER PUBLICATIONS

"Video compression makes big gains", IEEE Spectrum Oct. 1991, p. 16–19.

\* cited by examiner

*Primary Examiner*—Jingge Wu
(74) *Attorney, Agent, or Firm*—James J. Murphy, Esq.; Winstead Sechrest & Minick, P.C.

(57) ABSTRACT

Processing digital information made up of a plurality of n-bit samples is performed by raising each n-bit value to an x-bit value, x being greater than n. The x-bit values represent mid-band values, wherein in this context a band includes a sequential set of x-bit values having n most significant bits in common and a mid-band value is then an x-bit value approximately centered between the lowest and highest x-bit values of a band including that mid-band value. In some embodiments, the digital information may comprise video information. Thus, the process may be applied prior to converting the video information from a first color space (e.g., a red-green-blue (R-G-B) color space) to a second color space (e.g., a luminance-chrominance (Y-Cr-Cb) color space). For a particular embodiment, n may be equal to five or six, and x may be equal to eight, however, in general n may be variable amongst different ones of the samples.

22 Claims, 5 Drawing Sheets

METHOD AND APPARATUS FOR REDUCING NOISE DURING LOSSY TRANSFORMATION PROCESSES

FIELD OF THE INVENTION

The present invention relates to the preprocessing of digital information, for example video information, prior to subjecting the digital information to a lossy transformation process such as a data compression process.

BACKGROUND

With the convergence of digital information in the home, a need has arisen for the integration of home computers with other information appliances. In co-pending application Ser. Nos. 08/792,003 and 08/792,361, both filed Jan. 31, 1997, and assigned to the Assignee of the present invention, an exemplary digital wireless home network was described. The network has at its heart an information furnace that allows users to enjoy a variety of multimedia content distributed from a host computer to various appliances throughout the home. Within this vision of the information furnace, the home computer is established as the central aggregation point for digital content in the home, which content is then wirelessly distributed to locations and appliances throughout the home that are optimal for its consumption. These alternative consumption locations enable new dynamics in the use of multimedia content, including mobility, comfort, social interaction, and linkages with other household appliances, such as audio/visual systems. The information furnace further allows users to consume the content in their preferred locations (and even be mobile in the home if desired), enables multiple users to simultaneously interact with the content, and reduces the cost of the appliances used to access the content (computing resources, such as the CPU, memory and modem are leveraged from a central source).

The distribution of video information as part of the home network environment presents certain challenges for the network designer. For example, digital video information ordinarily destined for display on a computer monitor or other display unit is generally provided in an R-G-B (red-green-blue), noninterlaced format for that video display unit. If consumer appliances such as televisions are to make use of the video information, the format of this information must be altered to an acceptable format (e.g., NTSC compatible, interlaced video information). Thus, what is needed is a scheme for preprocessing the video information prior to presentation on the television display screen.

SUMMARY OF THE INVENTION

Processing digital information made up of a plurality of n-bit samples is performed by raising each n-bit value to an x-bit value, x being greater than n. The x-bit values represent mid-band values, wherein in this context a band includes a sequential set of x-bit values having n most significant bits in common and a mid-band value is then an x-bit value approximately centered between the lowest and highest x-bit values of a band including that mid-band value. In some embodiments, the digital information may comprise video information. Thus, the process may be applied prior to converting the video information from a first color space (e.g., a red-green-blue (R-G-B) color space) to a second color space (e.g., a luminance-chrominance (Y-Cr-Cb) color space). For a particular embodiment, n may be equal to five or six, and x may be equal to eight, however, in general n may be variable amongst different ones of the samples.

Additional embodiments may provide a network server that includes a video processor configured to process video information as described above prior to converting the video information from a first color space to a second color space to produce color corrected video information. The server may also include a radio configured to transmit the color corrected video information to at least one network client across a wireless link. In some cases, the color corrected video information may be compressed prior to transmission. Still further embodiments may provide color space correctors configured to perform the mid-banding processes, discussed above. Further, computer networks may include a server configured to convert video information from a first color space to a second color space by first mid-banding the video information and then color correcting the mid-banded video information to produce color corrected video information. Such networks may also include a client coupled in wireless communication with the server; the client being configured to receive the color corrected video information.

Additional embodiments may be apparent to those of ordinary skill in the art upon review of the following description and its accompanying drawings.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A video processing scheme that may find application in a digital wireless home network or other computer network environments is disclosed herein. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed to limit the scope of the present invention.

Figure 1:
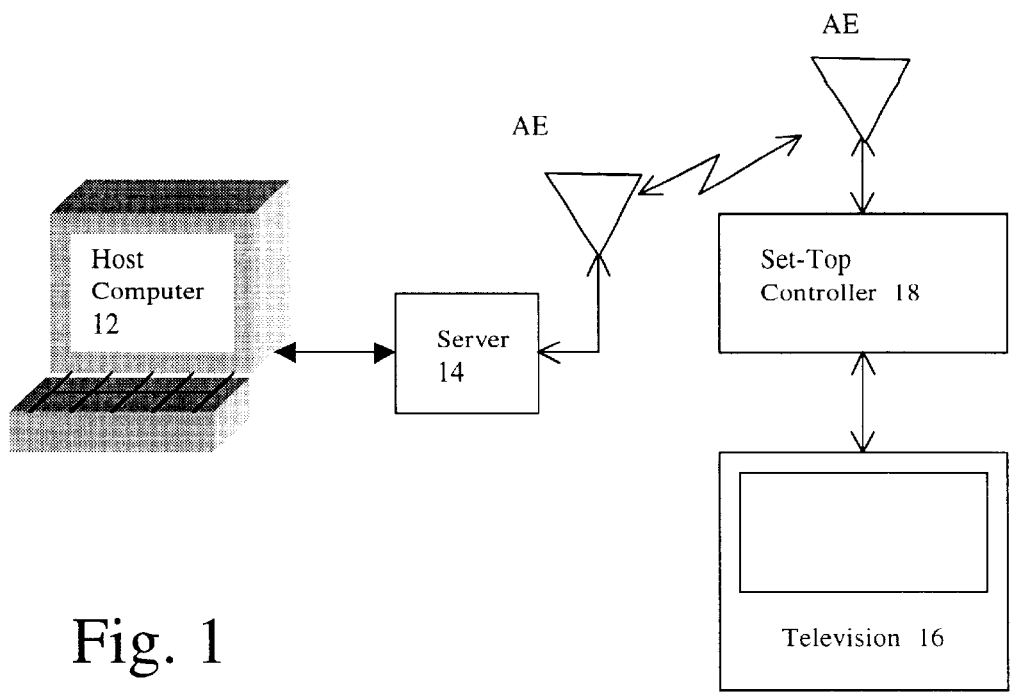
FIG. 1 illustrates components of a digital wireless home network according to one embodiment of the present invention.

FIG. 1 illustrates a digital wireless home network 10 configured in accordance with one embodiment of the present invention. Digital wireless home network 10 has at its heart a personal computer 12 and an accompanying server 14. Together, personal computer 12 and server 14 act as a central aggregation point for digital content (e.g., video, audio and graphical information), which content may then be wirelessly distributed to various locations and appliances, including television 16. Television 16 receives this digital content through set-top controller 18, which is coupled in wireless communication with server 14. Of course, in other embodiments, the wireless communication link between server 14 and set-top controller 18 may be replaced by a wired communication link. Also, although server 14 and set-top controller 18 are illustrated as separate components, in other embodiments the functions of server 14 may be included wholly or partially within personal computer 12 and those of set-top controller 18 may be included wholly or partially within television 16.

Included within the digital content transferred to television 16 across network 10 is video information. In one embodiment, the video information comprises digitally encoded video images relating to applications such as video-conferencing, interactive computing, entertainment and/or educational programming, etc. Preferably, this video information is transferred in a compressed data format to ease bandwidth requirements on the wireless (or wired) communication link.

Within the environment of network 10, the video information transferred to television 16 may originate as synthetic or computer-generated video information as may be produced or utilized by an application program running on personal computer 12. For example, network 10 allows a user session (separate from any other session that may be hosted on personal computer 12) to be initiated using set-top controller 18 as a gateway to personal computer 12 (e.g., via server 14). Thus, television 16 may be used as a display device for this session. As part of the session, computer-generated images (such as may comprise a user desktop and/or application specific image) will be displayed on television 16.

In general, the computer-generated video information for display on television 16 will be first produced at host computer 12 in a format more suited for display on a conventional, noninterlaced computer monitor. This is because computer application programs and operating systems are generally configured to provide video information for display on such devices. Therefore, before this video information can be displayed on television 16, it will have to be converted into a compatible format, for example, interlaced NTSC-compatible video. Server 14 and set-top controller 18 provide the necessary video display processing means to generate video information suitable for display on television 16 from the computer-generated video information provided by host computer 12.

Figure 2A:
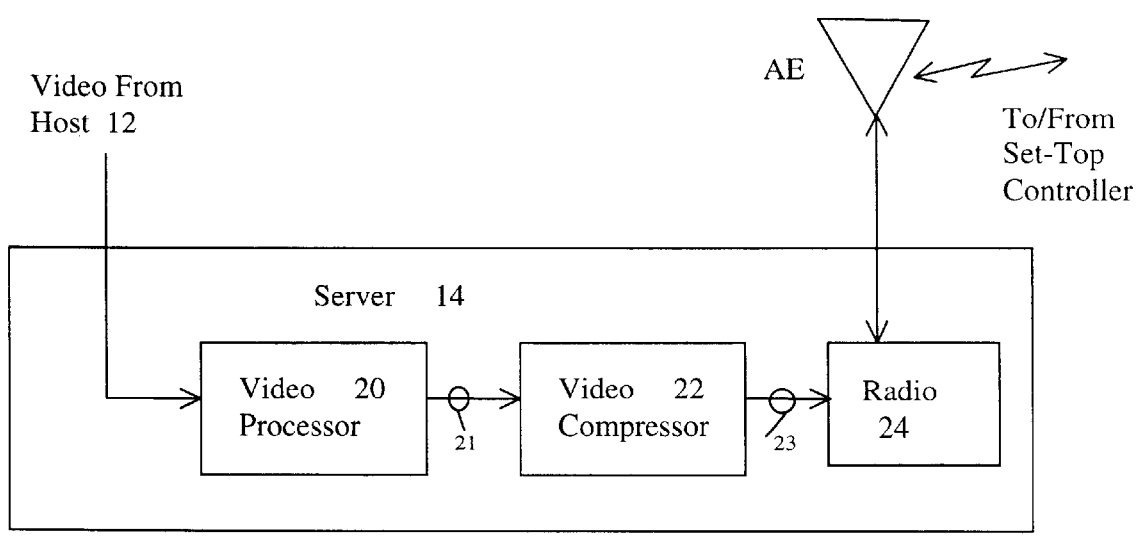
FIG. 2A is a functional representation of a server component of the digital wireless home network illustrated in FIG. 1 according to one embodiment of the present invention.
Figure 2B:
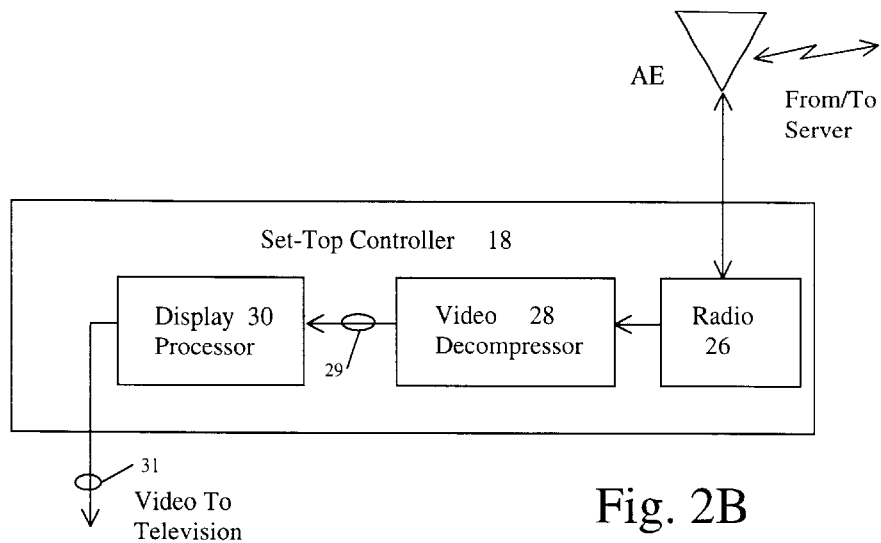
FIG. 2B is a functional representation of a set-top controller component of the digital wireless home network illustrated in FIG. 1 according to one embodiment of the present invention.

FIGS. 2A and 2B illustrate the functional components of server 14 and set-top controller 18 used in the conversion of the video information to a format suitable for display on television 16. As shown in FIG. 2A, video processor 20 receives video information from host computer 12. Video processor 20 is responsible for scaling the video information to a size appropriate for display on television 16. In general, computer-generated video information is produced with a vertical resolution that exceeds the usable display range of television 16, thus vertical scaling is required to fit the information into the display area provided by television 16. As part of the scaling process, video processor 20 may utilize anti-flicker filtering to reduce or eliminate the effects of flicker on the eventual display.

Many times, computer-generated video information is produced in an R-G-B (red-green-blue) format common to computer display devices. Although such video information may be transmitted within digital network 10, in one embodiment, video processor 20 is configured to convert or transform the R-G-B information into another color scheme, e.g., Y-Cr-Cb color space, which is more suitable for transmission to television 16. In Y-Cr-Cb color space, Y represents the luminance component of the video information while Cr and Cb represent the chrominance components.

The converted (and perhaps scaled) video information 21 is provided to video compressor 22 where it is reformatted prior to transmission to television 16. Any of a number of conventional video compression techniques may be used to reduce the bandwidth requirements of the video information 21. In one embodiment, a video compressor that utilizes wavelet compression technology may be used. As indicated above, the use of a video compressor 22 is optional, however, any scheme which does not employ some form of video compression will require more bandwidth for the transmission of the video information than schemes which do.

The compressed video data 23 is provided to a radio 24, which may packetize the data for transmission across the wireless communication link to set-top controller 18. In those schemes that rely on a wired communication link, other suitable media access devices (e.g., Ethernet access modules, etc.) may be used in place of radio 22. In one embodiment, radio 22 communicates with set-top controller 18 using a wireless, spread spectrum communication protocol adapted for use in network 10.

Now referring to FIG. 2B, at set-top controller 18 the video information from server 14 is received by radio 26. Radio 26 is configured to operate according to the same protocol as radio 24 in server 14; hence, the two radios 24 and 26 serve as the communication access devices for network 10. As indicated above, in other embodiments, e.g., where different communications media are used, other suitable communication media access devices may be used. Radio 26 may perform frame reconstruction operations to build up a complete frame of information from several packets that were transmitted by radio 24. Ultimately, radio 26 provides a frame's worth of compressed video information to a video decompression engine 28.

Video decompression engine 28 expands the compressed video information received from server 14 into a decompressed format and provides the resulting video information signals 29 to a display processor 30. Display processor 30 formats the video signals 29 into the required format for display on television 16. For example, in some embodiments, display processor 30 may provide the necessary horizontal and or vertical synchronization signals as well as dithering control and interlacing sequences required to display the video information on a conventional NTSC compatible television 16. Thus, set-top controller 18 provides NTSC (or other, e.g., PAL) compatible television video signals 31 to television 16.

Figure 3:
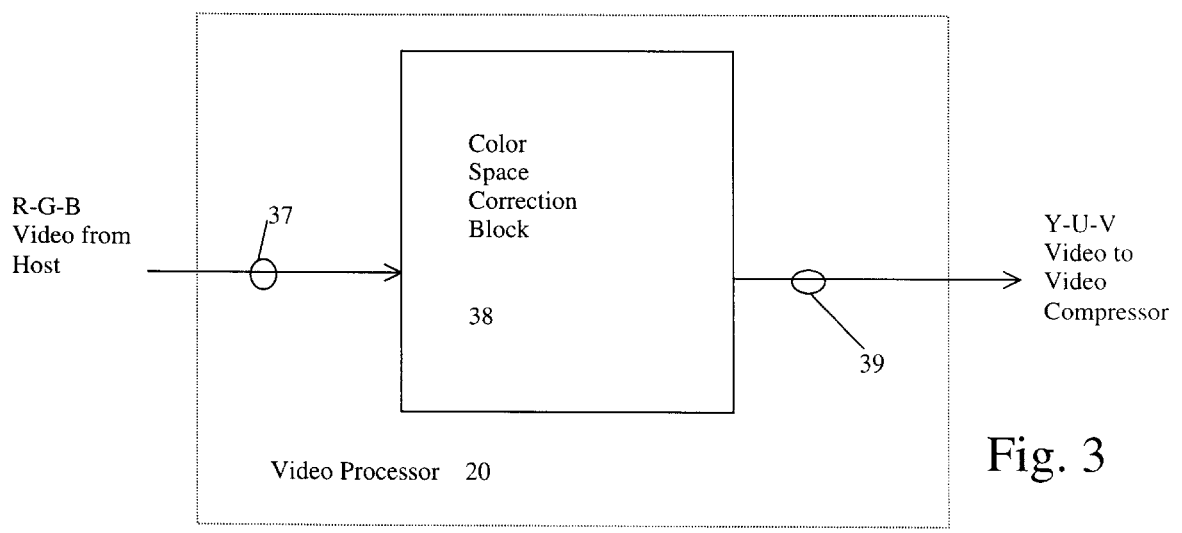
FIG. 3 illustrates some of the functional components of a video processor for the server component of the digital wireless home network illustrated in FIG. 2A according to one embodiment of the present invention.

FIG. 3 now illustrates one embodiment of video processor 20 of server 14 in more detail. Video processor 20 includes a color space correction (CSC) block 38. As noted above, CSC block 38 transforms R-G-B video information signals 37 to Y-Cb-Cr video information signals 39 prior to transmission of the video information from the server 14 to the set-top controller 18. In one embodiment, CSC block 38 performs this conversion according to the following formulas:

$$Y=0.257R+0.504G+0.098B+16$$

$$Cb=-0.148R-0.291G+0.439B+128$$

$$Cr=0.439R-0.368G-0.071B+128$$

The inverse transforms (e.g., for use a display processor 30) are:

$$R=1.164(Y-16)+1.596(Cr-128)$$

$$G=1.164(Y-16)-0.813(Cr-128)-0.392(Cb-128)$$

$$B=1.164(Y-16)+2.017(Cb-128)$$

In practice, it is expected that nominal ranges for Y, Cb and Cr are 16–235, 16–240 and 16–240, respectively, with a value of 128 equal to zero.

The R-G-B color information for each pixel of a frame received from host computer 12 is preferably presented to CSC block 38 in 16-bit format, with five bits of red and blue color information each, and six bits of green color information. Thus, there will be 32 (2') grades of R and B component and 64 (26) grades of G component. Before converting the R-G-B color information to Y-Cr-Cb color information, however, these values are preferably rounded up (i.e., normalized) to eight bit values.

Many schemes exist for converting the $R_5G_6B_5$ information to $R_8G_8B_8$ information. For example, bit roll over schemes such as the following may be used:

$X_5$->$x_4x_3x_2x_1x_0[x_4x_3X_2]$ (8.0), where X represents R or B; and $X_6$->$x_5x_4x_3x_2x_1x_0[x_5x_4]$ (8.0), where X represents G.

That is, to produce the eight bit representations of the five-bit red and blue color values, the five bits of color information may be padded with the three most significant bits thereof as new least significant bits. Similarly, the six-bit green color information may be padded to eight bits, using the two most significant bits thereof as new least significant bits. Other methods, such as adding random "noise" to the least significant bits of the eight-bit color value representations may also be used. In one particular embodiment, however, a unique mid-banding scheme is used to produce the eight-bit color value representations from the $R_5G_6B_5$ video information signals.

The mid-banding scheme is used to reduce noise that may other wise be acquired in the video information signals as the signals undergo the compression/decompression processes that will follow the color space conversion process. More generally, the mid-banding technique may be applied whenever a digital signal has its "bitness" or digital accuracy increased prior to being subjected to a lossy transformation process. Such lossy transformation processes generally manipulate the data values to generate output signals and then return the output signals to the original digital accuracy of the input signals. Inevitably, during the transformation process (e.g., data compression and decompression), some data (or, more particularly, some precision of the data) is lost. Thus, the recovered (i.e., decompressed) information (e.g., video data 29 in the illustrated example) will exhibit a certain amount of "noise" at the output of the process (e.g., the output of video decompressor 28).

Thus, when the decompressed video data 29 is converted back to the original $R_5G_6B_5$ format (e.g., by display processor 30), the reconstructed pixels may be shifted into adjacent "bands". In this context, the term "band" is meant to represent the range of a color component value in eight-bit representation, with the five (for red or blue) or six (for green) upper bits of that value being constant. For example, values between 0xA0 and 0xA7 belong to one 5-bit band, because their upper five bits are the same. The "width" of this 5-bit band is 8, and 0xA0 represents the bottom of the band, while 0xA7 represents the top.

Mid-banding, as the term implies, describes a process by which the truncated (i.e., 5- or 6-bit) R-G-B component values are incremented to exactly the middle of their respective bands before the color space conversion process is applied. The advantage of this procedure is apparent from a comparison of FIGS. 4A and 4B.

Figure 4A:
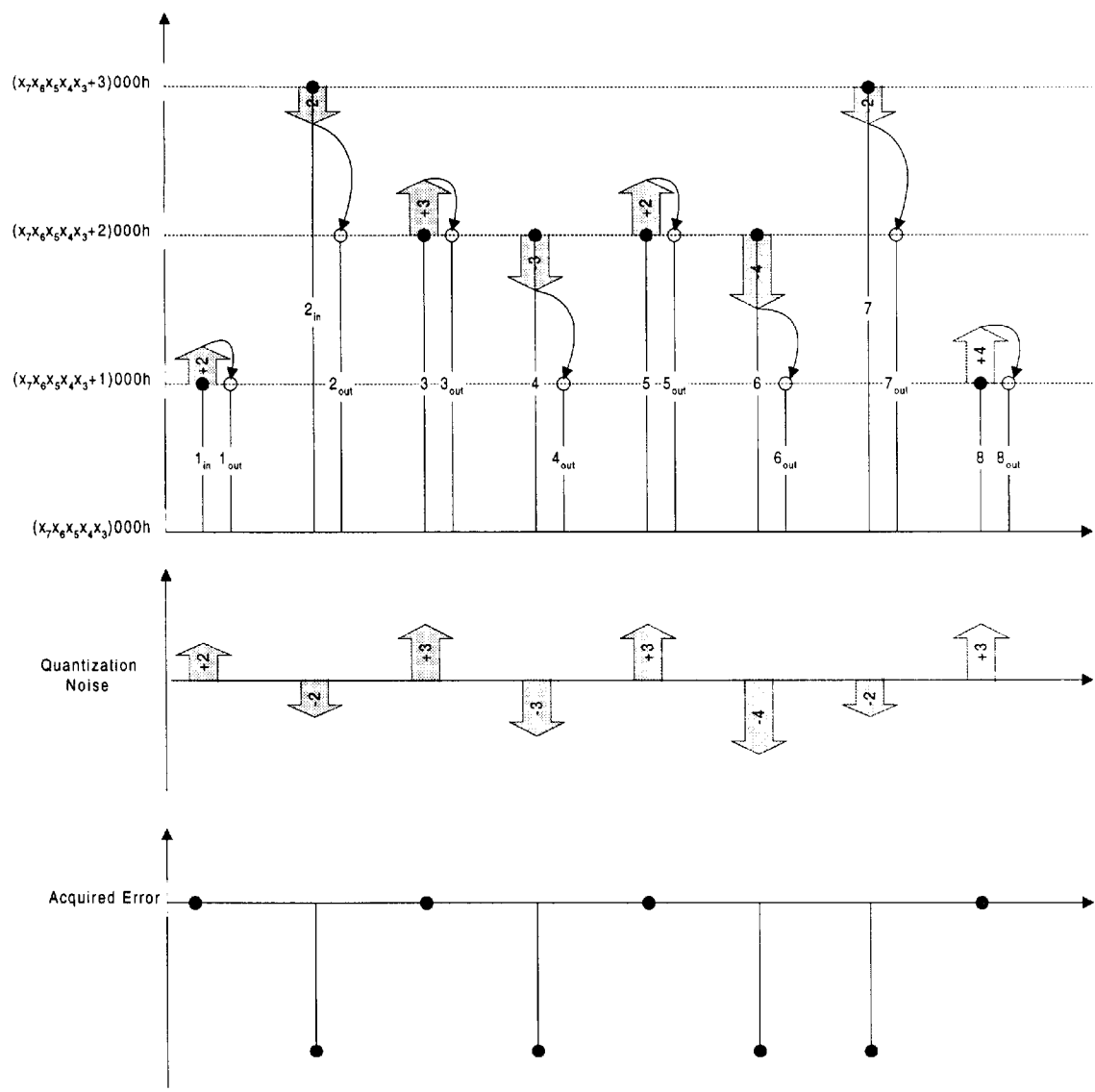
FIG. 4A is a graphical representation of an example of the introduction of error into a video signal due to quantization effects associated with a lossy compression/decompression process.

In FIG. 4A, a comparison of a hypothetical segment of input (e.g., 5-bit color values of pixels in a frame of video information) to and output of a lossy digital transformation channel (or process) is shown. In the top illustration, the input samples 1–8 are arranged across the horizontal axis, with their individual magnitudes (or values) plotted against the vertical axis. In this example, the original 5-bit accuracy of the input samples has been increased to 8-bit accuracy through zero-padding. No mid-banding is applied. The subscripts "in" and "out" denote the input and output values of the samples, respectively. Thus, the magnitudes of the input samples are represented by shaded or solid circles and the magnitudes of the output samples are shown with unshaded circles.

In the top and center illustrations, the shaded arrows indicate hypothetical noise superimposed on the input samples in the process of conversion (i.e., quantization noise introduced by the lossy transformation process). It is assumed that in the process of the lossy digital transform (i.e., the compression/decompression process) that some amount of noise will be acquired by the signals, with this noise being statistically centered around zero. The noise may be characterized by the second moment, $m_2=1$, where $m_2$ is defined as:

$$m_2=\sqrt{(\Sigma\delta^2)/N}$$

Note that $m_2$ can be interpreted as a measure of root-mean-square energy of the added perturbation (i.e., the noise added to the input samples).

In the bottom illustration, the acquired error now present in the output signals as a result of the noise introduced by the lossy transformation process is shown. Notice that because of the effects of zero-padding, each input value was first "promoted" to the bottom of its respective band and the noise then caused perturbations, which in some cases caused a particular value to be shifted outside its band. For example, sample 2 was shifted to the next lower band as a result of the noise. Thus, the overall acquired error value when the output samples are returned to the original 5-bit accuracy is –2, as shown.

Figure 4B:
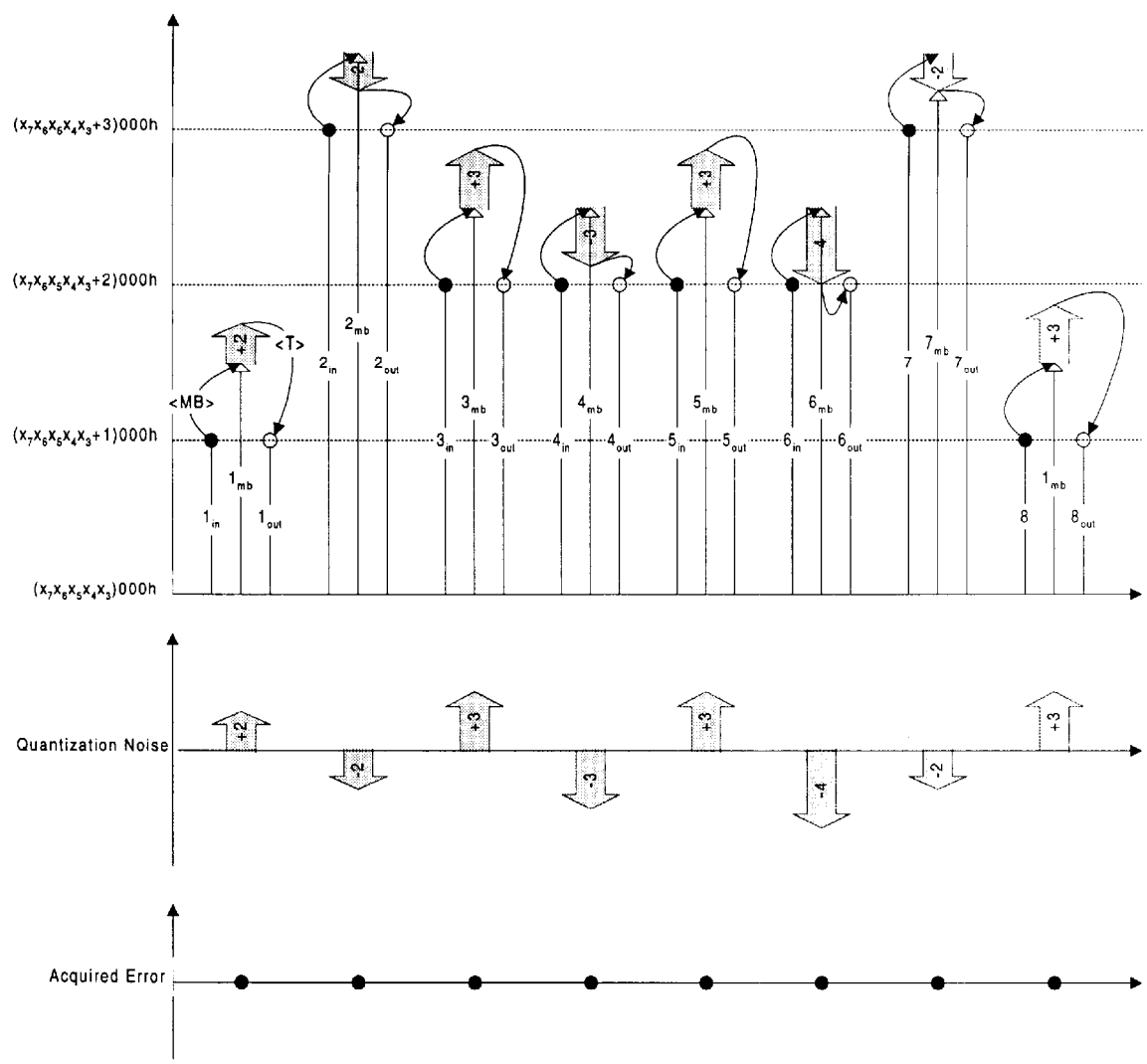
FIG. 4B is a graphical representation of an example of the reduction of error, in accordance with one embodiment of the present invention, which may otherwise be introduced in a video signal due to quantization effects as illustrated in FIG. 4A.

In FIG. 4B, the same samples are applied to the lossy transform, but this time mid-banding is employed prior to the transformation process. In the figure, the subscript "mb" indicates the value of a sample after mid-banding. It can be seen that where mid-banding is applied, the acquired error due to noise is zero (for this example); thus, placing the samples into the middle of their respective bands has preserved the original 5-bit accuracy in the samples. Note that this particular result is obtained because the same values for the noise as in FIG. 4A were used. Thus, none of the noise values were so great as to shift a mid-banded signal outside of its original band. It is possible that in some cases, the noise will be so great that such band shifting does occur, thus it cannot be guaranteed that mid-banding a signal prior to subjecting that signal to a lossy transformation process will always provide output signals with no acquired error.

Recall that the same signal without mid-banding acquired an error with the same root-mean-square energy, $m_2=1$, but with average error value is −2. This negative shift was explained by the fact that in the case of no mid-banding, each sample inherently resides at the bottom of its band, so that a negative perturbation of even minimal magnitude forces the sample to drop to the lower band, whereas it is stable to positive perturbations. In the case of mid-banding, however, the stability of a sample is balanced with respect to positive and negative perturbations. Thus, although it cannot be guaranteed that no error will be introduced when mid-banding is applied, it is true that any acquired errors will be balanced around zero and the overall energy of the noise should be reduced from the cases where no mid-banding is applied.

As an aside, it is possible to adjust the mid-band position to which a sample is normalized if the statistical nature of the quantization noise introduced by the compression/decompression process is known in advance. In the absence of such knowledge, however, it is reasonable to assume that the noise is symmetrically distributed about zero, leading to the choice of using the middle of the mid-band, as described above.

Figure 5:
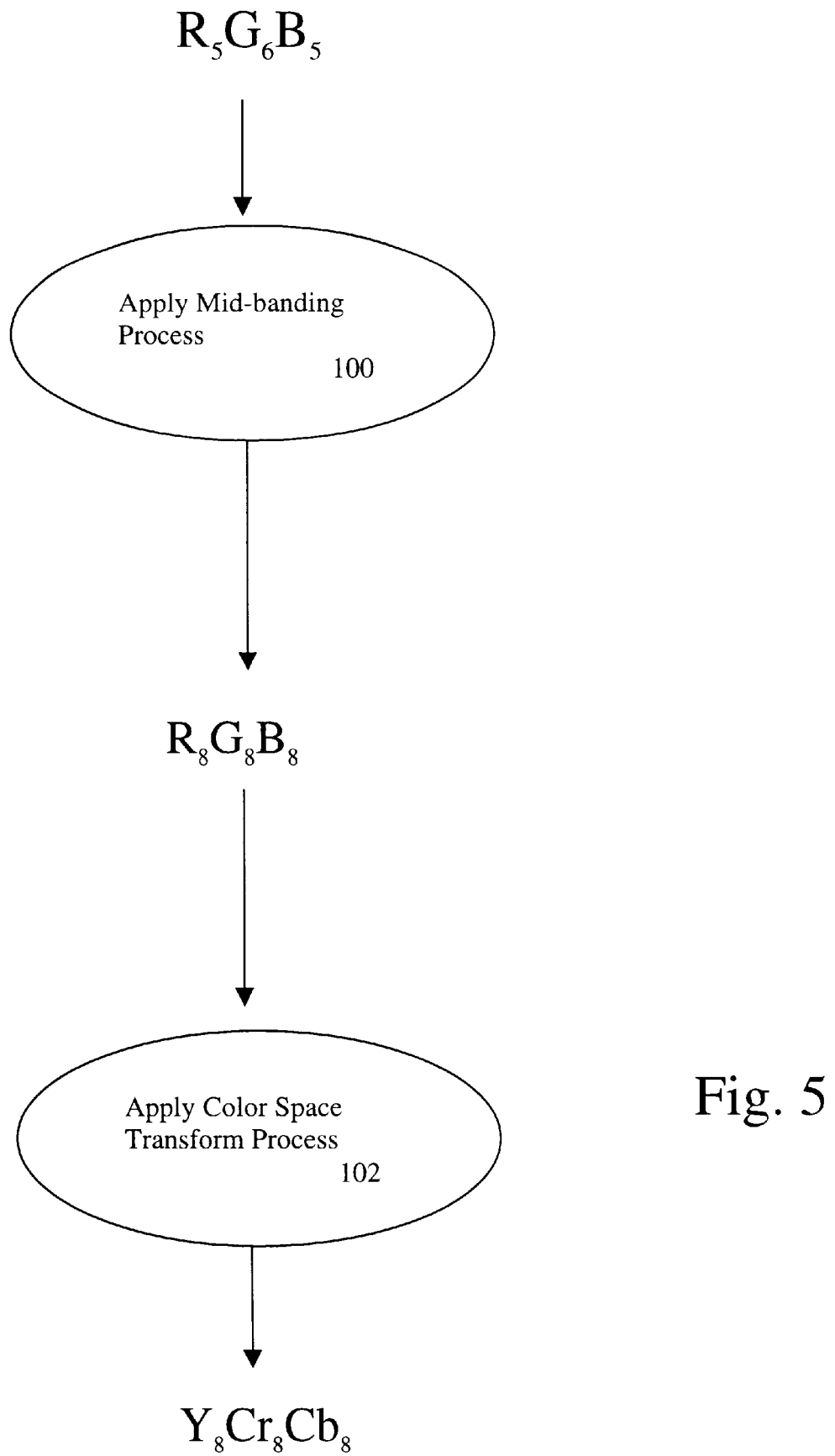
FIG. 5 is a flow diagram illustrating one method of mid-banding color component values of a pixel in a frame of video information in accordance with the present invention.

The mid-banding scheme may thus be applied to convert the $R_5G_6B_5$ video information to Y-Cr-Cb video information, as shown in FIG. 5. First, at step 100, the most significant bits of the individual color component of a pixel are shifted left so as to occupy the most significant bit positions in an eight-bit representation. Thus, the most significant bits will be left shifted by three (for red or blue) or two (for green) places, leaving the three (for red or blue) or two (for green) least significant bit positions as zeros. Then, the eight-bit color component values are shifted to their respective mid-bands, as illustrated in FIG. 4. The resulting eight-bit, mid-band color component values may then be applied, at step 102, to the above formulas to produce the eight-bit Y-Cr-Cb color component values.

By way of example, consider the case for a pixel of video information having five bits of red color information such that $R_5=10110$. Of course, the pixel will have green and blue color information, but the techniques discussed hereafter with reference to the red color information are equally applicable to these color values, with appropriate variations being made for the original six bits of green color information. The goal is to convert this five-bit value to a mid-banded eight-bit value before applying the color space conversion process. Therefore, the $R_5$ value is first zero-padded to yield an eight-bit value $R'_8=10110000=BO_h$. The eight-bit value $R'_8$ defines the bottom of a band from $BO_h$ to $B7_h$, as discussed above. The mid-band value is then $B3_h$ (or $B4_h$). So, prior to the color space conversion process, the eight-bit value $R'_8$ is raised to the mid-band value $R_8=10110011=B3_h$ (or another value approximately centered between the upper and lower limits of the band, e.g., $B4_h$). As indicated, the blue and green color component values may be similarly mid-banded prior to the color conversion process. Thus, stated more generally, each n-bit color component value (n being variable amongst these values) is first zero padded to produce an x-bit (e.g., 8-bit) color component value. Then, the zero-padded color component value is mid-banded using the techniques discussed above. This scaling of the color component values is performed prior to the color space conversion process itself.

Thus, a video processing scheme for a digital wireless home network or other computer network environment has been described. Although the foregoing description and accompanying figures discuss and illustrate specific exemplary embodiments, it should be appreciated that other embodiments may utilize different implementation details. For example, in some embodiments Y-U-V video information may be used in place of Y-Cb-Cr video information, with appropriate (e.g., conventional) transforms being employed by CSC block 38 and display processor 30. Thus, the present invention should be measured only in terms of the claims, which follow.

What is claimed is:

1. A method, comprising processing digital information made up of a plurality of n-bit samples by raising each n-bit value to an x-bit value, x being greater than n, the x-bit value representing a mid-band value, wherein a band comprises a sequential set of x-bit values having n most significant bits in common and a mid-band value comprises an x-bit value approximately centered between the lowest and highest x-bit values of a band including that mid-band value.

2. The method of claim 1 wherein the digital information comprises video information.

3. The method of claim 2 further comprising converting the video information from a first color space to a second color space after the processing.

4. The method of claim 3 wherein the first color space comprises a red-green-blue (R-G-B) color space.

5. The method of claim 4 wherein the second color space comprises a luminance-chrominance (Y-Cr-Cb) color space.

6. The method of claim 1 wherein n equals five or six.

7. The method of claim 1 wherein n is variable amongst different ones of the samples.

8. The method of claim 1 wherein x equals eight.

9. A color space converter, comprising means for processing video information made up of a plurality of n-bit samples by raising each n-bit value to a mid-banded x-bit value, x being greater than n, wherein a band comprises a sequential set of x-bit values having n most significant bits in common and a mid-banded value comprises an x-bit value approximately centered between the lowest and highest x-bit values of a band including that mid-banded value prior to converting the video information from a first color space to a second color space.

10. The color space converter, of claim 9 wherein the means for processing is configured to first zero-pad each of the plurality of n-bit samples to generate corresponding x-bit values prior to mid-banding the x-bit values by raising the corresponding x-bit values to the midbanded x-bit values.

11. The color space converter, of claim 10 wherein the video information is applied to the means for processing a n-bit values representing color components in a red-green-blue (R-G-B) color space.

12. The color space converter, of claim 11 wherein the output thereof comprises x-bit values representing color components in a luminance-chrominance (Y-Cr-Cb) color space.

13. The color space converter, of claim 12 wherein n equals five or six.

14. The color space converter, of claim 13 wherein x equals eight.

15. A network server, comprising:
a video processor configured to process video information made up of a plurality of n-bit samples by raising each n-bit value to a mid-banded x-bit value, x being greater than n, wherein a band comprises a sequential set of x-bit values having n most significant bits in common and a mid-banded value comprises an x-bit value approximately centered between the lowest and highest x-bit values of a band including that mid-banded value prior to converting the video information from a first color space to a second color space to produce color corrected video information; and a radio configured to transmit the color corrected video information to at least one network client across a wireless link.

16. The network server of claim 15 wherein the color corrected video information is compressed prior to transmission.

17. The network server of claim 15 wherein the video processor is configured to zero pad each of the plurality of n-bit samples to generate corresponding x-bit values prior to mid-banding the x-bit values by raising the corresponding x-bit values to the mid-banded x-bit values.

18. A computer network, comprising:

a server configured to process video information made up of a plurality of n-bit samples by raising each n-bit value to a mid-banded x-bit value, x being greater than n, wherein a band comprises a sequential set of x-bit values having n most significant bits in common and a mid-banded value comprises an x-bit value approximately centered between the lowest and highest x-bit values of a band including that mid-banded value prior to converting the video information from a first color space to a second color space to produce color corrected video information; and a client coupled in wireless communication with the server and configured to receive the color corrected video information.

19. The computer network of claim 18 wherein the first color space comprises a red-green-blue (R-G-B) color space.

20. The computer network of claim 19 wherein the second color space comprises a luminance-chrominance (Y-Cr-Cb) color space.

21. A method of processing digital data comprising a plurality of n-bit data values, the method comprising:

converting an n-bit data to x-bit data, wherein x>n, by padding the n-bit data with x-n bits;

mid-banding the x-bit data;

processing the midbanded x-bit data; and converting the processed x-bit data back into n-bit data.

22. The method of claim 21 wherein an upper end of a band comprises the n-bit data padded with '1' bits, a lower end of the band comprises the n-bit data padded with '0' bits, and midbanding the x-bit data comprises selecting the padding bits so that the midbanded x-bit data is substantially midway between the upper end and the lower end of the band.

* * * * *